United States Patent [19]

Von Holdt

[11] 4,289,473
[45] Sep. 15, 1981

[54] MOLD GATE PERMITTING THE INTRODUCTION OF STIFF MOLDING COMPOUND INTO A MOLD CHAMBER

[76] Inventor: John W. Von Holdt, 7430 N. Croname Rd., Niles, Ill. 60648

[21] Appl. No.: 109,478

[22] Filed: Jan. 4, 1980

[51] Int. Cl.³ .............................................. B29C 1/00
[52] U.S. Cl. ................................. 425/567; 264/328.9
[58] Field of Search .................................... 264/328.9; 425/566–569, 571

[56] References Cited

U.S. PATENT DOCUMENTS

| | | | |
|---|---|---|---|
| 2,437,625 | 3/1948 | Taylor | 425/567 X |
| 3,134,141 | 5/1964 | Hardy | 425/569 X |
| 3,696,840 | 10/1972 | Odhner | 425/543 X |
| 3,704,723 | 12/1972 | Wheaton | 425/190 X |
| 3,936,261 | 2/1976 | Jones | 425/567 X |
| 4,033,485 | 7/1977 | Kohler | 425/548 X |

FOREIGN PATENT DOCUMENTS

51-56865 5/1976 Japan .............................. 264/328.9

*Primary Examiner*—Thomas P. Pavelko
*Attorney, Agent, or Firm*—Charles F. Pigott, Jr.; Garrettson Ellis

[57] ABSTRACT

A gate member for admitting plastic material into a mold which comprises a hollow member defining a bore having a longitudinal axis and an inner wall for separating the bore from a mold chamber positioned between mold halves. Aperture means extends through the inner wall, being peripherally spaced from the longitudinal axis and preferably defining an angle of essentially 30° to 60° to the longitudinal axis, diverging outwardly in the direction of the mold chamber. Also, preferably, the inner wall defines a centrally-positioned peak pointing toward the bore and having sloping sides, to assist in directing molten plastic toward the peripherally spaced aperture means. Also, rib means may be provided, pointing inwardly and extending radially from the central portion of the inner wall toward the periphery thereof, to reinforce the inner wall.

11 Claims, 3 Drawing Figures

MOLD GATE PERMITTING THE INTRODUCTION OF STIFF MOLDING COMPOUND INTO A MOLD CHAMBER

BACKGROUND OF THE INVENTION

This application relates to a mold gate which works effectively for all molding compounds, but exhibits the added advantage of working effectively with ultra-stiff molding compounds, for example, glass-filled materials and the like, as may be used for molding high-strength buckets or any other desired item.

Conventionally, it has been proven to be difficult to inject very stiff molding compounds into an injection molding system through a mold gate. Even if ultra-high pressure injection is used, stagnant areas can develop in the mold gate, where degradation of the molding compound can take place.

Particularly in the case of thin-walled plastic molded members such as the bottom of a bucket, the stiff molding compound typically in the prior art enters in perpendicular relationship to the narrow channel of the mold which defines the bucket bottom. The turning of the stiff molding compound and its spreading through the narrow channel serves as a major source of flow resistance, so that even large capacity injection mold systems pass such compound only with difficulty through the orifice of the mold gate when a small, centrally-located orifice in the mold gate is used.

By another technique, a mold gate with a larger orifice may be used to reduce flow resistance, but this leaves a large, projecting sprue from the bottom of the bucket which then must be cut away.

In accordance with this invention, a mold gate is provided, causing easier injection of stiff molding compound into the mold cavity, especially when the cavity is of very narrow dimensions such as the bottom of a bucket, while avoiding stagnant areas in the mold gate and consequent scorching or burning of the molding compound. Furthermore, in this invention, a shortened sprue may be obtained, being provided by the reinforced, thin-walled characteristic of the mold gate.

Accordingly, it becomes possible by the use of the mold gate of this invention to injection mold ultra-stiff materials, which had previously been impractical for use in injection molding machinery of similar capacity while using a conventional mold gate.

DESCRIPTION OF THE INVENTION

In this invention, a gate member is provided for admitting plastic material into a mold. The gate member comprises a hollow member defining a bore having a longitudinal axis, and an inner wall for separating the bore from a mold chamber positioned between mold halves. Aperture means extends through the inner wall.

In accordance with this invention, the aperture means is peripherally spaced from the longitudinal axis and defines an angle to the longitudinal axis, diverging outwardly in the direction of the mold chamber. Preferably, the aperture means defines a plurality of spaced, outwardly-diverging apertures, positioned peripherally through the inner wall about the axis, each defining circumferential, arcuate sections.

It is also preferable for the peripherally spaced aperture means to define an angle of essentially 30° to 90° to the longitudinal axis.

The gate member of this invention may also have an inner wall which defines a centrally-positioned peak pointing toward the bore and having sloping sides. The purpose of this is to assist in directing molten plastic toward the peripherally-spaced aperture means, to eliminate a potential stagnant area in the immediate vicinity of the central portion of the inner wall. The elimination of a stagnant area in the mold gate of this invention reduces the possibility of overheating molding compound which resides too long in the stagnant area, and thus degrades due to excessive exposure to heat.

It is also preferable for the inner wall to define rib means pointing inwardly and extending radially from a central portion of the inner wall toward the periphery thereof. The purpose of this is to reinforce the inner wall against the high pressure imparted by the injection of molding compound through the mold gate. Because the inner wall is reinforced, it may be thinner than would be otherwise possible without running the danger of blowing out the end of the mold gate.

The thinner inner wall permits shorter aperture means, which, in turn, can result in a shorter mold sprue. This mold sprue may be positioned in a recess of a molded bucket, if desired, so that there is no need for a step of cutting away the mold sprue after removal of the molded article, as has sometimes been necessary in prior art processes.

Figure 1:
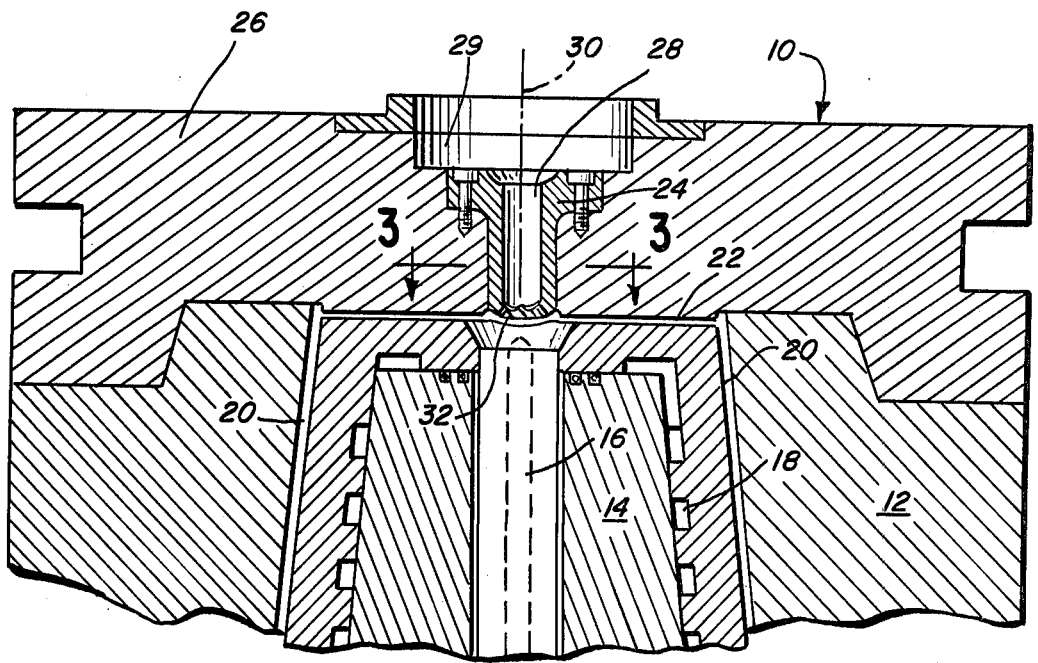
FIG. 1 is a fragmentary, longitudinal sectional view of an injection molding system for a molded bucket, utilizing the mold gate of this invention.

Referring to the drawings, a partial view of an injection molding system 10 is disclosed utilizing the invention of this application.

Injection molding system 10 is specifically shown to be a bucket mold, but it is contemplated that the gate member of this invention may be utilized in conjunction with any type of molding system for the manufacture of any molded item.

Outer mold 12 is shown, being generally of conventional design, as is mold core 14 which includes a push rod 16 for removal of the bucket, and cooling passageways 18, all of which may be of conventional design. Outer mold 12 and mold core 14 define together a mold cavity 20 of the shape of the desired bucket, including an end wall chamber 22 which may be relatively thin as shown.

Mold gate 24 is shown to be bolted to upper portion 26 of outer mold 12. Mold gate 24 is a hollow, cylindrical member defining a bore 28 which, in turn, defines a longitudinal axis 30.

Mold gate 24 also defines inner wall 32 separating bore 28 from mold chamber 20, and specifically end wall chamber 22 as shown.

Aperture means specifically defining separate apertures 34 extends through inner wall 32. Apertures 34 each define slots in the shape of circular arcs.

Figure 2:
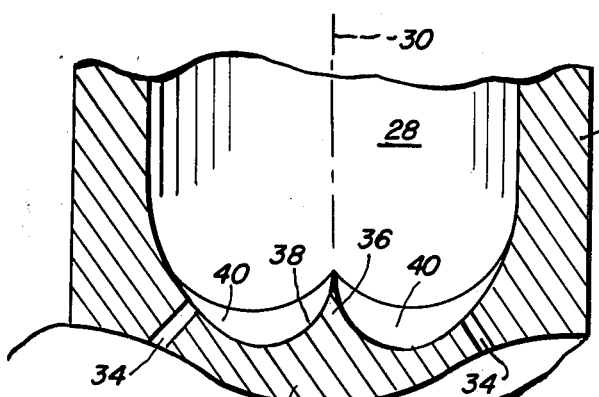
FIG. 2 is an enlarged, fragmentary, longitudinal sectional view of the inner end of the mold gate of this invention.
Figure 3:
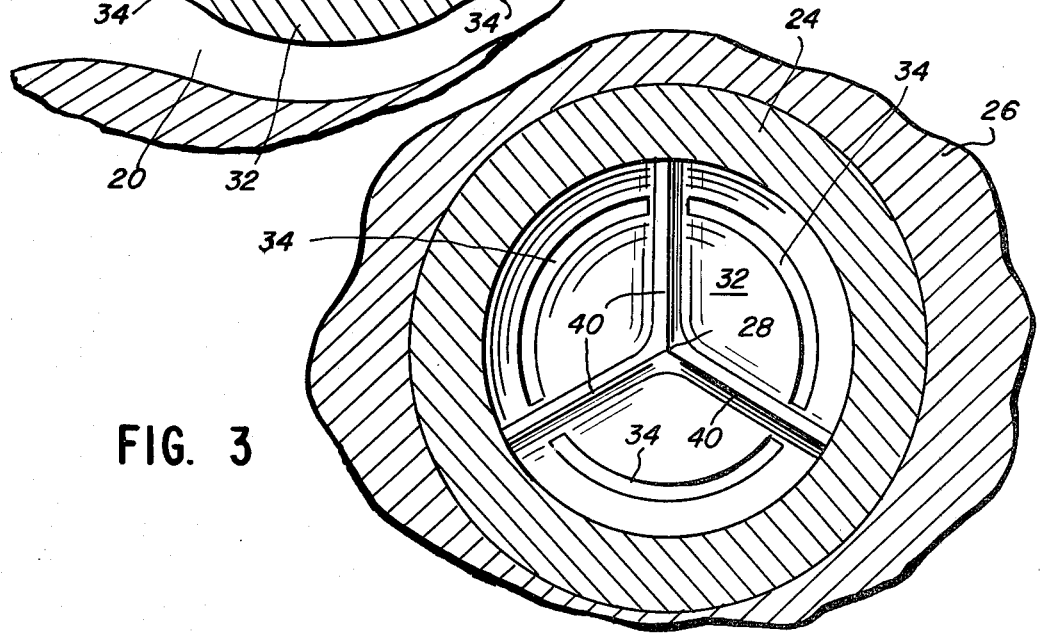
FIG. 3 is an enlarged sectional view taken along line 3—3 of FIG. 1.

In accordance with this invention, apertures 34 are shown to be spaced from longitudinal axis 30, and to define a diverging cross-sectional angle as shown in FIG. 2, preferably of essentially 30° to 60°, to longitudinal axis 30, with apertures 34 diverging outwardly in the direction of mold chamber 20. Specifically, the angle may be about 45°.

Inner wall 32 also defines a centrally positioned generally conical peak 36, pointing toward bore 28 and having sloping sides 38 to assist in directing molten plastic toward the peripherally-spaced apertures 34.

Molding compound passes from space 29, where it has been heated into molten form, into bore 28 of mold gate 24, for insertion to the mold cavity 20 through apertures 34.

The sloping sides 38 of peak 36 tend to cause a flow of plastic material outwardly away from axis 30 in the vicinity of inner wall 32 as plastic material passes through gate 24, which eliminates the stagnant central area previously described.

The mold gate of this invention may also define radially extending ribs 40, which extend from a central portion of inner wall 32 toward the periphery thereof, for the purpose of reinforcing the inner wall against the pressure imparted by the injection of molding compound through the gate 24. Because of this, the thickness of wall 32, and the corresponding thickness of apertures 34, can be substantially reduced without the danger of end wall 32 bursting due to pressures created within the valve gate 24. As stated above, the shortened thickness of apertures 34 reduces the height of the resulting sprue that may be produced in the molded part. If desired, this sprue may be placed in a recessed portion of the bucket, for example, so that the bucket can stand evenly without interference from any mold sprue, so that the sprue does not have to be cut in a separate operation after the molding step.

The above has been offered for illustrative purposes only, and is not intended to limit the invention of this application, which is as defined in the claims below.

What is claimed is:

1. In a gate member for admitting plastic material into a mold, which comprises a hollow member defining a bore having a longitudinal axis and an inner wall for separating said bore from a mold chamber positioned between mold halves, and aperture means extending through said inner wall, the improvement comprising:

said aperture means being peripherally spaced from the longitudinal axis, and defining an angle of essentially 30° to 90° to the longitudinal axis, diverging outwardly in the direction of said mold chamber, said inner wall defining a centrally positioned peak upstream of said peripherally-spaced aperture means, pointing toward said bore, and having sloping sides, to assist in directing molten plastic toward said peripherally-spaced aperture means.

2. The gate member of claim 1 in which said aperture means defines a plurality of spaced, outwardly diverging apertures positioned peripherally through the inner wall about said axis.

3. The gate member of claim 2 in which said inner wall defines rib means pointing inwardly and extending radially from a central portion of the inner wall toward the periphery thereof, to reinforce said inner wall against the pressure imparted by the injection of molding compound through said gate.

4. The gate member of claim 2 in which said aperture means are circumferentially positioned and are substantially greater in their circumferential length than in their width.

5. The gate member of claim 1 in which said aperture means defines an angle of essentially 30° to 60°.

6. The gate member of claim 1 in which said inner wall for separating said bore from a mold chamber is integral with the remainder of said gate member.

7. In a gate member for admitting plastic material into a mold, which comprises a hollow member defining a bore having a longitudinal axis, and an inner wall for separating said bore from a mold chamber positioned between said mold halves, and aperture means extending through said inner wall, the improvement comprising, said aperture means being peripherally spaced from the longitudinal axis and defining an angle to the longitudinal axis, diverging outwardly in the direction of said mold chamber, said inner wall defining rib means extending radially from a central portion of the inner wall toward the periphery thereof, to reinforce said inner wall against the pressure imparted by the injection of molding compound through said gate.

8. The gate member of claim 7 in which said inner wall defines a centrally positioned peak upstream of said peripherally-spaced aperture means, pointing toward said bore, and having sloping sides, to assist in directing molten plastic toward said peripherally spaced aperture means.

9. The gate member of claim 8 in which said aperture means defines an angle of essentially 30° to 60° to the longitudinal axis, diverging outwardly in the direction of said mold chamber.

10. The gate member of claim 9 in which said aperture means are circumferentially positioned and are substantially greater in their circumferential length than in their width.

11. The gate member of claim 7 in which said inner wall for separating said bore from a mold chamber is integral with the remainder of said gate member.

* * * * *